STABLE OSCILLATOR

Filed Dec. 30 1958 2 Sheets-Sheet 1

INVENTOR.
ROBERT H. DICKE
BY

ATTORNEY

March 1, 1960 R. H. DICKE 2,927,278

STABLE OSCILLATOR

Filed Dec. 30, 1958 2 Sheets-Sheet 2

INVENTOR.
ROBERT H. DICKE
BY J. C. Whittaker
ATTORNEY

United States Patent Office 2,927,278

Patented Mar. 1, 1960

2,927,278

STABLE OSCILLATOR

Robert H. Dicke, Princeton, N.J.

Application December 30, 1958, Serial No. 783,860

9 Claims. (Cl. 331—3)

The present invention relates to a stable oscillator and particularly to an improved, self-oscillating atomic clock.

In the beam type molecular oscillator and in all other atomic or molecular resonance systems of the cavity type, the resonance frequency and line shape are affected by the cavity tuning. This is simply an example of the familiar tuning interaction of two coupled, tuned circuits. If, for example, the cavity dimensions should change, the output frequency of the atomic clock would be effected.

An object of the present invention is to provide an improved atomic or molecular oscillator in which the cavity is always maintained tuned to the resonance frequency of the resonant substance within the cavity.

Another object of the invention is to provide a system for maintaining the cavity resonator "on frequency" in such a way that the atomic or molecular resonance does not affect the information on cavity tuning and the cavity tuning signal does not mask that of the atomic or molecular resonance.

According to the invention, the resonant frequency of the cavity and that of the resonant substance within the cavity are compared and, when they are different, an error signal is produced. The error signal is applied to the cavity resonator tuning means in a sense to maintain the cavity tuned to the resonant frequency.

An ingenious arrangement is employed for separating the information on cavity tuning from that due to the resonant substance. The cavity and resonant substance are shock excited as, for example, by suddenly and momentarily completing a regenerative feedback loop extending from the output to the input circuit of the cavity resonator. When the cavity resonator is shock excited, it rings at the frequency to which it is tuned. This ringing is the dominant signal immediately after the excitation but it dies out rapidly (exponentially). A time gate is used to pass the cavity resonator ringing signal (or one derived from it) to a frequency or phase comparison device. The resonant substance signal (or one derived from it) is passed at a later time through a frequency gate—a narrow band amplifier, to the comparison device. The narrow band amplifier continues to ring after the excitation has been removed for a time sufficiently long for portions of the two signals (cavity ringing and amplifier ringing) to be time coincident. If, during this period, the two signals differ in frequency, an error signal is developed. The error signal may be converted to a direct current and used to control the cavity tuning.

The invention will be described in greater detail by reference to the following description taken in connection with the following drawing in which.

Figure 1:
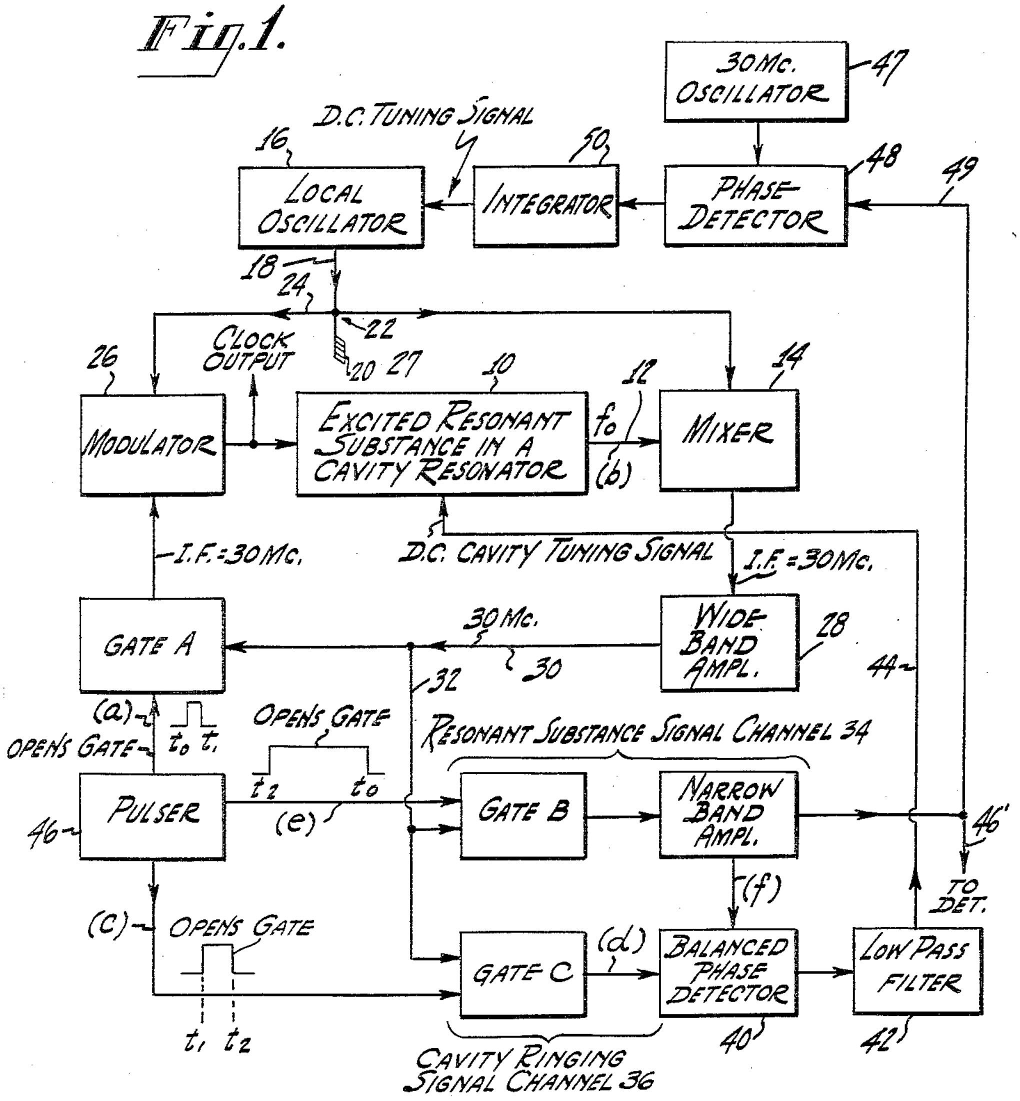
Fig. 1 is a block circuit diagram of a preferred form of the invention.
Figure 2:
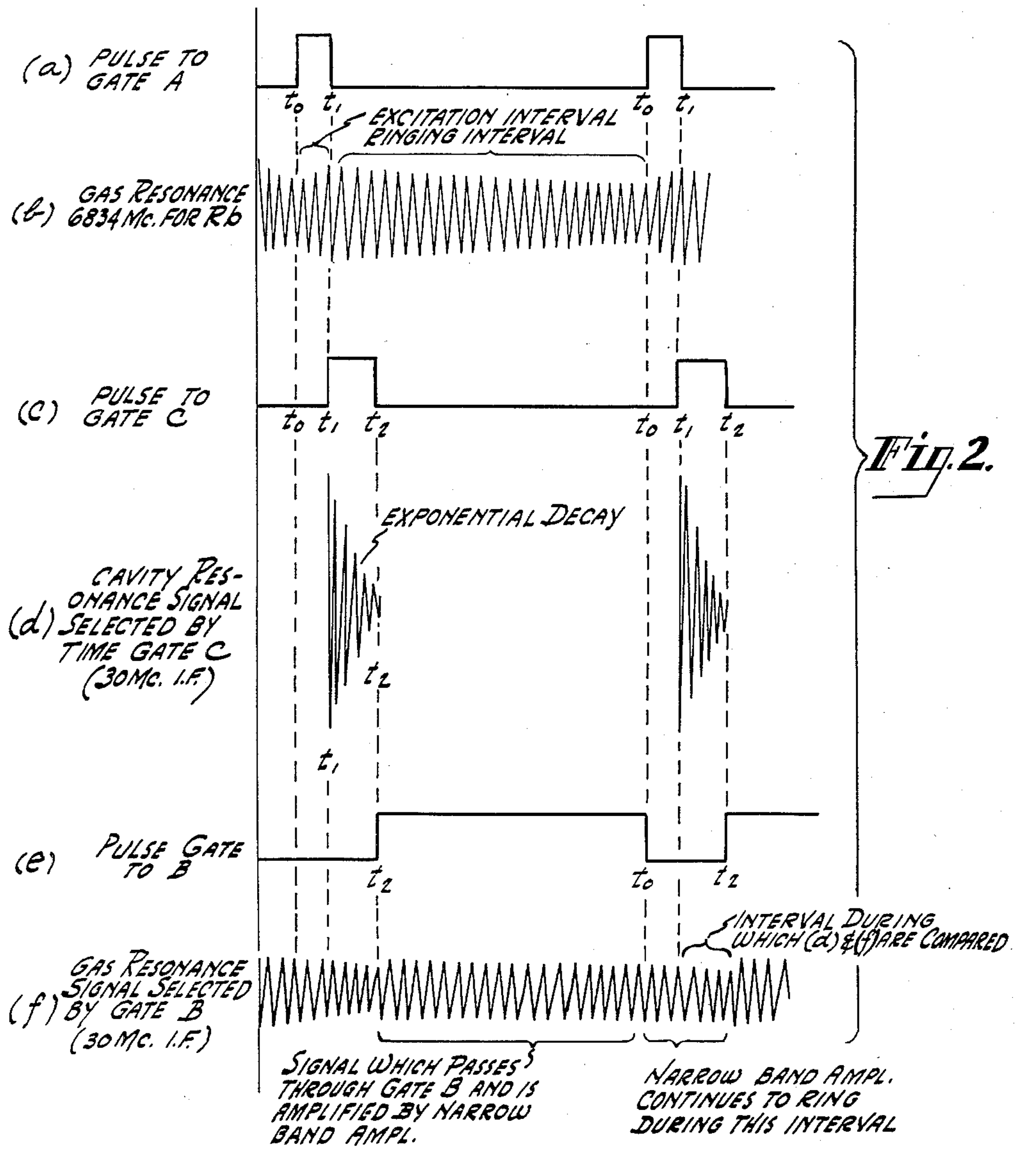
Fig. 2 is a drawing of waveforms present at various places in the circuit of Fig. 1.

Block 10 in Fig. 1 represents a cavity resonator containing an excited resonant substance. In brief, block 10 may include a vessel filled with an alkali earth metal vapor such as sodium, potassium, rubidium, or the like mixed with a buffer gas such as helium, argon, neon, hydrogen or the like. The alkali earth metal vapor may be placed through optical pumping in its excited condition, that is, in a condition such that an applied microwave at the resonant frequency of the vapor can cause it to oscillate. An arrangement of this general type is shown in Figs. 1 and 2 of Patent No. 2,836,722, issued May 27, 1958, to the present applicant and Thomas R. Carver.

In other forms of the invention, block 10 may be an arrangement such as shown in Fig. 3 of the above patent and explained in detail therein. In brief, this comprises a two-chambered diffusion arrangement which includes two cavity resonators having a common apertured wall. The gas molecules diffuse between the two resonators. The gas may be ammonia, ethyl chlorate, or one of the other gases listed in the patent. When properly excited, the gas can be made to oscillate.

In another form of the invention, the gas in the cavity resonator may be placed in its excited condition by a beam type device. In brief, a beam of the gas is passed through a high intensity electric field and during its passage through the field molecules of the gas in lower energy states are attracted toward the field producing means and those in the higher energy states are focused and directed into the cavity resonator. Accordingly, the molecules in the cavity resonator are characterized by a negative Boltzmann factor temperature, that is, they are in condition to oscillate.

For the purposes of the present discussion, it will be assumed that the excited resonant substance in the cavity resonator is rubidium vapor. This vapor has been found to be especially suitable for an atomic clock. Its resonant frequency of interest here is 6834 megacycles$=f_0$.

One may assume that noise or some other transient effect has caused oscillations at 6834 megacycles to be produced by the rubidium gas in the cavity resonator. These are applied via output lead 12 to a mixer 14. Oscillations generated in local oscillator stage 16 are applied to a mixer via arms 18 and 20 of the magic T hybrid-junction 22. The local oscillator 16 may be a klystron, magnetron, or the like and its frequency should be relatively close to that of the resonant frequency of circuit 10. To permit use of standard components in the stages following mixer 14, the local oscillator frequency may be 6804 megacycles, a frequency differing from the resonant frequency by 30 megacycles.

Local oscillations are also applied via arms 18 and 24 of the magic T to a modulator stage 26. The latter may be a crystal rectifier, for example.

The fourth arm of the magic T is preferably matched to prevent reflections back to the magic T junction. This is illustrated schematically by symbol 27.

Returning to the right of the figure, the output of mixer 14, which consists of a 30 megacycle intermediate frequency signal, is applied to wide band amplifier 28. This amplifier may have a bandwidth of several megacycles or so. The amplified intermediate frequency signal is applied through gate A to the modulator 26. It may be assumed for the present that gate A is open (the feedback loop is closed). The signal produced by modulator 26 is equal to $f_0+30$ megacycles $-30$ megacycles$=f_0$, the resonant frequency of the rubidium gas. The delays and amplification in the feedback loop are such that there is regeneration and the rubidium continuously oscillates at the resonant frequency.

A portion of the 30 megacycles signal at lead 30 is applied via lead 32 to the resonant substance signal channel 34 and the cavity ringing signal channel 36. The former channel consists of a gate B and a narrow band amplifier 38. The amplifier has a bandwidth of the order of a thousand to ten thousand cycles, for example. The cavity ringing channel 36 includes a gate C. The output signals from the two channels are applied to a balanced phase detector 40. The output of the phase detector, when one is present, is converted by low pass filter 42 to a D.C. tuning signal and the latter is applied to the cavity resonator via lead 44.

The tuning means in the cavity resonator may be any one of several well known types and accordingly is illustrated by single block 10. For example, the signal may be applied to a heating element which thermally controls the cavity dimensions. Alternatively, the error signal can be applied to a servo motor which controls the cavity dimensions or the insertion of a tuning element into the cavity resonator. Alternatively, the tuning signal can be applied to a reactive crystal in the cavity which controls the cavity tuning.

Pulser 46 produces the gate pulses which open and close gates A, B, and C. This, too, is a standard circuit and may consist of singly stable multivibrators, for example, each triggered by the lagging edge of the pulse of the preceding stage.

The operation of the system can be better understood by referring to Fig. 2. Pulse *a* is short and is applied from pulser 46 to gate A in a sense to open the gate and thereby to close the feedback loop. During the gate interval $t_0$ to $t_1$ the rubidium in the cavity resonator oscillates, the feedback sustaining the oscillations. During the remainder of each cycle, that is, $t_1$ to $t_0$ the rubidium continues to ring at its resonant frequency of 6834 megacycles. The amplitude of the resonance decreases very slightly during this interval as the relaxation time is relatively long. This decrease in amplitude is somewhat emphasized in Fig. 2*b*.

During the interval $t_0$ to $t_1$, that is, the resonant substance excitation interval, the cavity resonator is also excited and the cavity ringing builds up to a signal of high amplitude. At time $t_1$ the cavity ringing signal amplitude has attained a very high value, however, thereafter it decays exponentially as shown in Fig. 2*d*. At time $t_1$, the cavity ringing signal is many times stronger than the gas ringing signal, the difference in amplitudes being much greater than that shown in the drawings. The frequency of the cavity ringing signal depends on the cavity dimensions. For optimum system performance the frequency of the cavity ringing signal should be precisely the same as the resonant frequency of the rubidium. The cavity ringing signal is allowed to pass to the cavity ringing signal channel 36 by opening gate C during the period immediately after gate A has been opened. The gate pulse which opens gate C is shown in Fig. 2*c*. The duration of this gate puse $t_1$ to $t_2$ is preferentially sufficiently long to permit the cavity ringing signal amplitude to decay to a low value.

It should be appreciated that during pulse *c*, there is also present on lead 32 the signal due to the rubidium. However, this signal is initially of much smaller amplitude than the signal due to the cavity ringing and may be ignored for all practical purposes.

After time $t_2$, pulser 46 applies a gate pulse *e* to gate B. This pulse has a duration $t_2$ to $t_0$—the remainder of the period between the gate pulses applied to gate A. During the interval $t_2$ to $t_0$ the cavity ringing signal has all but disappeared (it must be remembered that this signal decays exponentially). Accordingly, the signal passed by gate B is predominantly the one due to the rubidium. It is amplified to the proper level by narrow band amplifier 38.

The interval during which the gas signal and the cavity ringing signal are compared is $t_1$ to $t_2$. During this interval gate B is closed. However, the narrow band amplifier continues to ring at the 30 megacycle resonant frequency of the amplifier just as the resonant substance continues to ring at its resonant frequency. Accordingly, during the interval $t_1$ to $t_2$ both the 30 megacycle signal derived from the resonant substance signal and the 30 megacycle signal derived from the cavity ringing signal are present. The balanced phase detector 40 compares signals *d* and *f* during the interval $t_1$ to $t_2$. When the signals are of the same frequency, no output is produced by the phase detector, however, when they are different, an error signal is produced. This error signal is changed by low pass filter 42 to a D.C. tuning signal which, as already mentioned, is fed back to the cavity resonator tuning element.

It is desirable to maintain the local oscillator frequency stable. One method of improving the stability is to detect the 30 megacycle signal at lead 46 and to employ the detected signal in a standard frequency control arrangement. A direct current is produced which is indicative of any change in the frequency of oscillator 16. It may be fed back to a tuning element in the local oscillator for stabilizing the local oscillator frequency.

A preferred way of stabilizing the local oscillator is with the circuit comprising phase detector 48, reference oscillator 47 and frequency control lead 49. A change in the tuning of the local oscillator 16 results in a change in the 30 megacycle signal derived from the resonant substance. The resulting phase shift of this signal relative to the reference oscillator 47 produces a tuning signal to keep the local oscillator correctly tuned. An integrator 50 is preferably placed between the phase detector and local oscillator for smoothing the D.C. tuning signal.

Both of these means of controlling the tuning of the local oscillators serve to keep the 30 megacycle signal derived from the resonant substance at the predetermined frequency of the narrow band amplifier. Hence, the ringing frequency of this amplifier is equivalent to the frequency derived from the resonant substance.

If desired, the oscillator 47 to which the signal from the resonant substance is locked may be supplied to the phase detector 40 in place of the signal from the narrow band amplifier 38. In this case, the narrow-band amplifier is not necessary and may be omitted.

What is claimed is:

1. In apparatus in which an excited resonant substance is in a cavity resonator, an arrangement for maintaining the cavity resonator tuned to a resonant frequency of the substance comprising, in combination, means for comparing the resonant frequency of the cavity resonator with that of the resonant substance and, when they are different, producing an error signal; and means responsive to said error signal for maintaining the cavity resonator tuned to said resonant frequency of said substance.

2. In combination, a cavity resonator tuned to a resonant frequency of a given resonant substance; a given resonant substance in said cavity resonator; means for shock exciting said cavity resonator and resonant substance, whereby the cavity resonator rings at a frequency to which it is resonant and the resonant substance oscillates at a frequency to which it is resonant, the ringing of the cavity resonator being of much greater amplitude than the oscillation of the resonant substance immediately after the shock excitation; means for phase comparing the signal output from the cavity resonator immediately after it is shock excited with the signal produced at a later time by the resonant substance; and means responsive to a difference in frequency between the two compared signals for tuning said cavity resonator.

3. An arrangement for separating information concerning the frequency to which a cavity resonator is tuned from information concerning the frequency of an excited resonant substance within the resonator comprising, in combination, means for shock exciting the cavity resonator, whereby the resonator rings at the frequency to which it is tuned and the substance emits energy at a resonance frequency which is substantially equal to the frequency to which the cavity resonator is tuned, the initial amplitude of the cavity ringing being much larger than the resonant substance signal and said cavity ringing decaying exponentially with time, whereby the amplitude of the cavity ringing is shortly substantially smaller than the resonant substance signal; means for sensing the cavity ringing signal during the period it is of substantially larger amplitude than the resonant substance signal; and means for sensing the resonant substance signal during the time it is of substantially larger amplitude than the cavity ringing signal.

4. An arrangement for separating information concerning the frequency to which a cavity resonator is tuned from information concerning the frequency of an excited resonant substance within the resonator comprising, in combination, means for shock exciting the cavity resonator, whereby the resonator rings at the frequency to which it is tuned and the substance emits energy at a resonance frequency which is substantially equal to the frequency to which the cavity resonator is tuned, the initial amplitude of the cavity ringing being much larger than the resonant substance signal and said cavity ringing decaying exponentially with time, whereby the amplitude of the cavity ringing is shortly substantially smaller than the resonant substance signal; means for sensing the cavity ringing signal during the period it is of substantially larger amplitude than the resonant substance signal; means for sensing the resonant substance signal during the time it is of substantially larger amplitude than the cavity ringing signal; and means for comparing the frequency of the two signals sensed to produce an error signal when the two signals differ in frequency.

5. An arrangement for separating information concerning the frequency to which a cavity resonator is tuned from information concerning the frequency of an excited resonant substance within the resonator comprising, in combination, means for shock exciting the cavity resonator, whereby the resonator rings at the frequency to which it is tuned and the substance emits energy at a resonance frequency which is substantially equal to the frequency to which the cavity resonator is tuned, the initial amplitude of the cavity ringing being much larger than the resonant substance signal and said cavity ringing decaying exponentially with time, whereby the amplitude of the cavity ringing is shortly substantially smaller than the resonant substance signal; a gate circuit; means for passing the cavity ringing signal and resonant substance signal through said gate circuit during the period where the former is of much larger amplitude than the latter; a second gate circuit; and means for passing the cavity ringing and the resonant substance signal through the second gate circuit at the time the cavity ringing is of substantially smaller amplitude than the resonant substance signal.

6. In an atomic clock, a cavity resonator; a resonant substance within the resonator which oscillates at the resonant frequency of the cavity resonator; a regenerative feedback loop extending from the output to the input circuit of said cavity resonator for maintaining said substance oscillating; means for effectively closing and then opening said feedback loop, thereby shock exciting said cavity resonator, whereby the resonator rings at the frequency to which it is tuned and the substance emits energy at its oscillating frequency, the initial amplitude of the cavity ringing being much larger than the resonant substance signal and said cavity ringing decaying exponentially with time, whereby the cavity ringing is shortly substantially smaller than the resonant substance signal; means for sensing the cavity ringing signal during the period it is of substantially larger amplitude than the resonant substance signal; means for sensing the resonant substance signal during the time it is of substantially larger amplitude than the cavity ringing signal; means for comparing the two signals sensed and, when they are different in frequency, producing an error signal; and means responsive to said error signal for maintaining said cavity resonator tuned to the frequency at which said resonant substance oscillates.

7. In the combination as set forth in claim 6, said means for sensing the cavity ringing signal comprising a time gate circuit, and said means for sensing the resonant substance signal comprising a narrow band amplifier.

8. A stable oscillator comprising, in combination, a cavity resonator; a resonant substance within the resonator which oscillates at the resonant frequency of the cavity resonator; an oscillator operating at a frequency close to that of said resonant substance; a mixer to which the oscillator signal and resonant substance signal are applied for producing an intermediate frequency signal; a modulator to which the intermediate frequency signal and the oscillator signal are applied for producing a sum signal; means for applying said sum signal to said cavity resonator so as to maintain said resonant substance oscillating; means for closing and then opening the circuit between said mixer and modulator thereby shock exciting said cavity resonator, whereby the cavity rings at an initial amplitude much larger than that of the resonant substance signal, said cavity ringing decaying exponentially with time, whereby the amplitude of the cavity ringing is shortly substantially smaller than the resonant substance signal; first and second gate circuits connected to receive said intermediate frequency signal; means for closing said first gate circuit during the period when the cavity ringing is of substantially larger amplitude than the resonant substance signal; means for closing the second gate circuit when the resonant substance signal is of substantially larger amplitude than the cavity ringing; means for comparing the frequencies of the signals passed by the two gate circuits and, when they are different, deriving a cavity tuning signal; and means responsive to said cavity tuning signal for maintaining said cavity resonator tuned to the resonant frequency of said resonant substance.

9. In the combination as set forth in claim 8, said second gate circuit including a narrow band amplifier which continues to ring at the intermediate frequency after said second gate circuit is closed.

No references cited.